T. W. CASE.
SIGNALING SYSTEM.
APPLICATION FILED NOV. 17, 1920.
1,412,385. Patented Apr. 11, 1922.
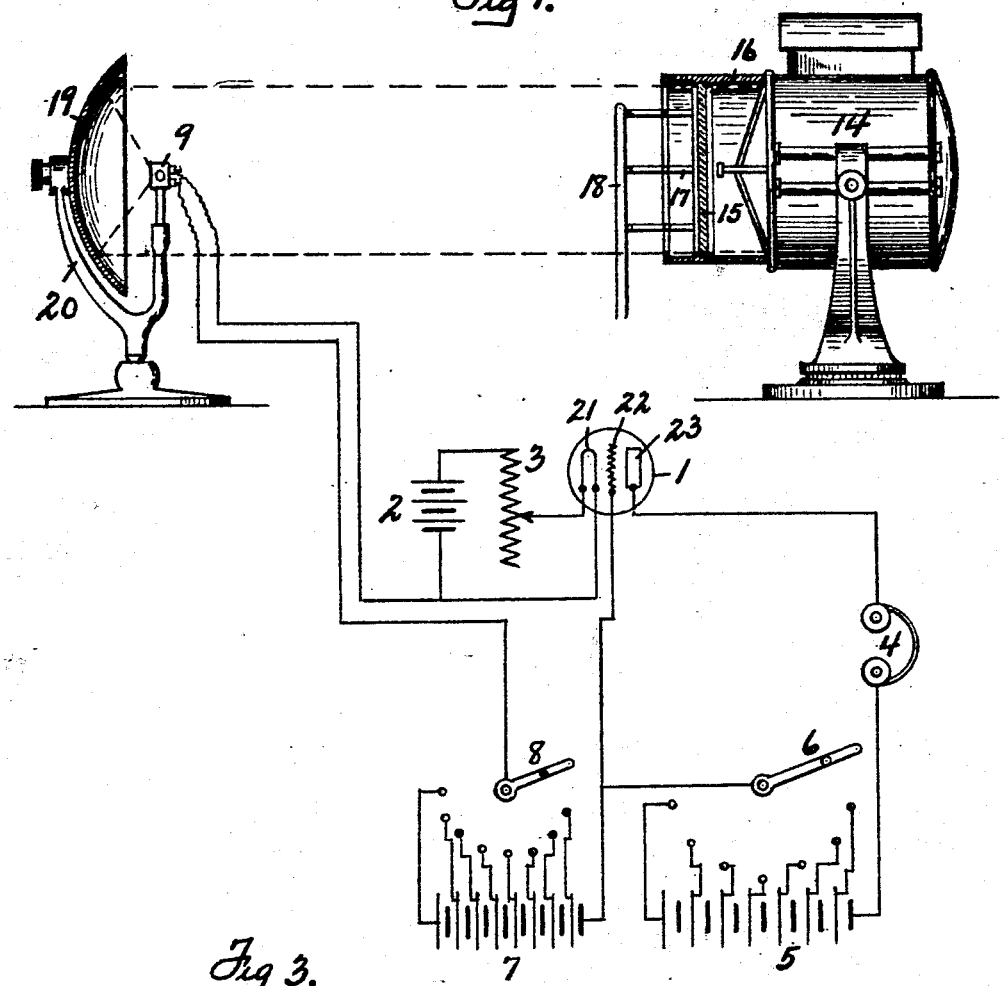
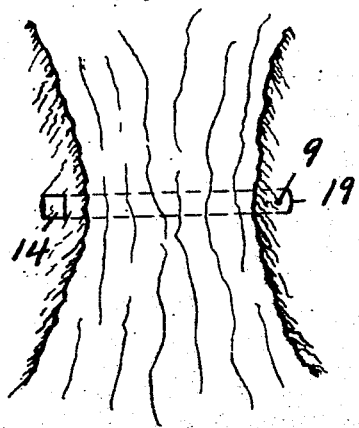

UNITED STATES PATENT OFFICE.

THEODORE W. CASE, OF SCIPIO, NEW YORK.

SIGNALING SYSTEM.

1,412,385.   Specification of Letters Patent.   Patented Apr. 11, 1922.

Application filed November 17, 1920. Serial No. 424,784.

*To all whom it may concern:*

Be it known that I, THEODORE W. CASE, of Scipio, in the county of Cayuga, in the State of New York, have invented new and useful Improvements in Signaling Systems, of which the following, taken in connection with the accompanying drawings, is a full, clear, and exact description.

This invention relates to certain new and useful signaling systems and apparatus for carrying out the same, and is a continuation in part of my co-pending application Ser. No. 213,225 which has now become Patent No. 1,379,166, dated May 24, 1921.

One of the principal objects of the invention is to utilize light waves emitted from a suitable source to vary a local current in accordance with variation in the light waves emitted at the sending station, and of such character that an indicating instrument can respond to such variations.

Another object is to provide a novel and highly sensitive system for detecting light rays, both visible and invisible and translating said rays into signals of an audible character.

Another object is the production of an apparatus utilizing a source of light for transmitting the signals, and a normally pulsating circuit, including a resistance sensitive to said light, so as to vary the frequency of pulsation in said circuit and produce a perceptible signal upon variations in said resistance effected in direct accord with variations in the light rays to which said resistance is subjected.

Another object is to produce an apparatus of the character described which shall have a high degree of sensitivity in detecting and translating light rays into signals. In the drawings:

Figure 1 is a partly diagrammatic view of the apparatus.

Figure 2 is a fragmentary sectional detail of one form of light-sensitive device.

Figure 3 is a view illustrative of my system of detection as applied to a harbor.

In my system I employ transmitting means for sending light rays and receiving means, comprising a light-responsive device for detecting the incoming light rays producing an audible or other signal, of a character determined by the light rays transmitted. It is important in systems of this character that as strong a signal as possible be produced so that the effective range of the system will be large.

I have discovered that a pulsation generator may be controlled by the light-responsive device and may in turn control an indicating instrument to produce a strong response in the latter on slight change in impedance of the light-responsive device. While other forms of hook-ups of the pulsation generator may be employed, I prefer to use the form of connection shown in Figure 1.

The pulsation generator comprises a vacuum tube or bulb —1— containing a filament —21—, grid —22— and plate —23—, the filament being provided, as shown, with a battery or other source of E. M. F. —2—, preferably connected in series with a rheostat —3—. The indicating device may assume the form of receivers —4— preferably of a large number of turns, connected in series with the battery —5— across the grid —22— and plate —23—. Preferably the voltage of the battery —5— should be adjustable so that the potential across the grid and plate may be varied, and for this purpose I have provided a multipoint switch —6— tapped in at various points of the battery. A similar battery —7— and switch —8— may be provided in series with the light-responsive device —9— across the filament —21— and grid —22— permitting regulation of the potential across the filament and grid.

The degree of vacuum in the bulb should be regulated in accordance with the filament temperature and the potentials applied to the circuits so that a note of musical frequency may thereby be produced in the telephone or other receivers upon variations in effective resistance of the light-responsive device —9—.

I have discovered that when the degree of vacuum in the bulb is properly regulated in accordance with the character of the light-reactive resistance and the voltage of the sources of potential, that the current in the circuits described will pulsate at a frequency desired, as for instance, an audible frequency or a frequency bordering on audibility so that upon variations of the resistance in the circuit, a variation in the frequency of pulsation of the current carried in such circuit is produced, resulting in the production of audible signals by the telephone receivers, or in variations in pitch of the normal signal. The maximum sensitivity under predetermined voltage of the sources of potential can perhaps best be determined by experiment and in practice I have connected the audionic bulb in circuit with sources of variable potential through a set high resistance in place of the light cell, so that the potentials can be varied if desired, at the same time that the proper degree of pressure is being produced in the audionic bulb.

Preferably the audionic bulb is completely evacuated at least to such an extent as can reasonably be effected, and then while the apparatus is connected, a suitable gas which may be air or preferably an inert gas of low dielectric constant, such as Argon, is permitted to leak into the evacuated bulb until the maximum sensitivity is reached under predetermined resistance and potential conditions. The bulb is then sealed and the apparatus is in condition for permanent use.

The practical operation of this apparatus necessitates the presence of a gas in the bulb which differentiates this apparatus in its operation definitely from the audionic bulb used in ordinary wireless operation. The gas pressure within the bulb may vary from one-tenth to five millimeters of mercury, whereas the pressure in the usual audionic tube approximates .000001 of a millimeter of mercury. However, in general practice, it may be found more desirable to use gas pressures varying from two to three millimeters of mercury in connection with sources of potential suitable for operation therewith.

Various types of substances such as selenium, thalium sulphide, etc., may be employed as the light-responsive devices or in the light-reactive cell. I prefer, however, for the purposes of secrecy, to use a substance particularly sensitive to the invisible rays of the spectrum, such substances being disclosed in my United States Letters Patent Nos. 1,301,227, dated April 22, 1919, and 1,309,181, dated July 8, 1919. As disclosed in the last mentioned patents, a compound of thalium and sulphur is particularly sensitive in the infra red region of the spectrum, while a compound of thalium and iodine is particularly sensitive in the ultra violet region, but due to the greater wave length I prefer to use the infra red region of the spectrum as its transmission is very much greater than visible light or ultra violet rays in atmosphere. By using one or the other of these materials, signals may be sent and received without detection by the naked eye or ordinary optical instruments.

Any suitable mounting may be utilized for the light responsive device. Thus in Figure 2, I have shown the sensitive element —9— supported by a pair of posts —11— of gold or other metal secured to, but insulated from a casing —10—. A watertight glass cover-plate —12— may be provided for the casing.

The sending means comprises a source of illumination, preferably including a screen for transmitting only invisible rays and means for interrupting and establishing the illumination at will. The source of illumination may be an ordinary incandescent bulb or any other source of light, or may assume the form of a universally mounted, high intensity searchlight —14— capable of casting a beam of substantially parallel rays dependent upon conditions and the distance signals to be sent. If it is desired to transmit only the infra red rays, a screen —15— of smoked glass of sufficient thickness to transmit only such rays, or other substance opaque to short wave length light rays, may be employed. The screen —15— may be conveniently located transversely of a drum-shaped extension —16— on the front of the searchlight.

While the beam may be controlled by making and breaking the searchlight circuit, if an electric searchlight is employed, I prefer to use a shutter because of its simplicity and reliability. Thus a shutter —17— of opaque material may be mounted at the front end of the extension —16— and may be opened and closed by means of a rod —18— adapted to be operated either manually or otherwise.

The effectiveness of the light-responsive device at the receiving end may be enhanced by the use of a reflector or other light-concentrating device —19—, the device —9— being located at the focus of the reflector. The members —9— and —19— may be detachably mounted in a bracket —20—.

From the foregoing description it will be obvious that on operating the shutter —17— at the sending end, the note in the receiver —4— at the receiving end will change in pitch so that a system of Morse or other code signals may be employed for transmitting intelligence from one station to the other. Furthermore, if the screen —15— is employed, it is impossible for any one unequipped with specially designed apparatus to detect the signals or even suspect that signaling is being carried on. The shape of the beam of light used is a question of expediency under different conditions. In sweep signaling, it may be desirable to use a beam having a large vertical spread with a minimum lateral spread.

It will be appreciated that my system possesses marked advantages over existing systems of signaling. Thus, assuming that it is employed to signal between friendly ships in war time, as the system may be directive, the signals cannot be picked up and read by the enemy unless the latter happens to be located in the line connecting the sending and receiving instruments and then only by special apparatus. Furthermore, by employing the screen —15— there will be nothing visible to betray the fact that signaling is being carried on. The sending means may be noiseless in its operation so that a ship in distress, for example, a torpedoed ship, could signal for help without arousing suspicion on the part of the enemy.

My invention may also be readily employed in harbor defense. Thus the sending means —14— may be located on one side of the harbor (see Fig. 3) in such a position as to send its beam across the inlet as close to the water level as practicable, and the receiving means —9—, —19—, may be located anywhere in the beam and the translating means may be located at any point desired. Obviously the passage of any object, such as a ship, or even a periscope of a submarine through the beam of light would cause a signal to be given at the receiving end. This system of detection is advantageous that it offers no obstacles or dangers to friendly ships and may be totally invisible to the enemy, thus throwing the latter off his guard.

The vacuum vessel —1— with its three electrodes arranged and connected as described, constitute a pulsation generator or a pulsation producing device which can be so adjusted as to produce musical sounds of audible frequency in receivers —4—. The operation of this device is, therefore, distinctly different from present known devices of similar mechanical structure used in connection with wireless receiving apparatus embodying normally oscillating circuits containing more marked capacities and inductances than the circuits of the apparatus here illustrated and which are not, therefore, highly sensitive to slight changes in resistance. Further, although the frequency of the circuits shown may be constant under constant conditions yet such frequency is much more readily changed and varied than in circuits containing more marked capacities and inductances as commonly used in practice. As a result the frequency is quite easily varied and slight changes in circuit condition, as for instance in impedance are readily detected, and translated into variations in pitch of the note produced in the receivers.

In accordance with the provisions of the patent statutes, I have herein described the principle of operation of my invention, together with an apparatus which represents a practical embodiment of the mechanical features thereof, but I desire to have it understood that the apparatus shown is only illustrative and that the invention can be carried out by other means. Also, while it is designed to use the various features and elements in the combination and relations described, some of these can be altered and others omitted without interfering with the general results outlined and the invention extends to such use.

What I claim is:

1. In a signaling apparatus, means for transmitting light rays, 3 spaced electrodes, means for heating one of the electrodes, a bulb enclosing said electrodes and containing an inert gas at a pressure between $\frac{1}{10}$ of a millimeter of mercury and 5 millimeters of mercury, and circuits connecting said electrodes, one of the same including a source of potential and a light-reactive resistance, and means for translating variations in said light-reactive resistance into audible signals.

2. In a signaling apparatus, means for transmitting light rays, 3 spaced electrodes, a bulb enclosing said electrodes and containing an inert gas at a pressure between $\frac{1}{10}$ of a millimeter of mercury and 5 millimeters of mercury, and circuits connecting said electrodes, one of the same including a source of potential and a light-reactive resistance, and means for translating variations in said light-reactive resistance into audible signals.

3. In a signaling apparatus, means for transmitting light rays, 3 spaced electrodes, means for heating one of the electrodes, a bulb enclosing said electrodes and containing a gas at a pressure between $\frac{1}{10}$ of a millimeter of mercury and 5 millimeters of mercury, and circuits connecting said electrodes, one of the same including a source of potential and a light-reactive resistance, and means for translating variations in said light-reactive resistance into audible signals.

4. In a signaling apparatus, means for transmitting light rays, 3 spaced electrodes, means for heating one of the electrodes, a bulb enclosing said electrodes and containing and Argon gas at a pressure between $\frac{1}{10}$ of a millimeter of mercury and 5 millimeters of mercury, and circuits connecting said electrodes, one of the same including a source of potential and a light-reactive resistance, and means for translating variations in said light-reactive resistance into audible signals.

5. In a signaling apparatus, means for transmitting light rays, 3 spaced electrodes, means for heating one of the electrodes, a bulb enclosing said electrodes and containing an inert gas at a pressure between $\frac{1}{10}$ of a millimeter of mercury and 5 millimeters of mercury, circuits connecting said electrodes, including a light-reactive resistance and a source of potential, the amount of said resistance, the potential and the pressure in said bulb being so regulated that the current pulsates at a frequency at or bordering on audibility, and means whereby variations of light intensity falling on said resistance, and thereby varying the frequency of pulsations of said current are recognized as variations in pitch of a musical tone.

6. In a signaling apparatus, means for transmitting light rays, 3 spaced electrodes, means for heating one of the electrodes, a bulb enclosing said electrodes and containing a gas at a pressure between $\frac{1}{10}$ of a millimeter of mercury and 5 millimeters of mercury, circuits connecting said electrodes, including a light-reactive resistance and a source of potential, the amount of said resistance, the potential and the pressure in said bulb being so regulated that the current pulsates at a frequency at or bordering on audibility, and means whereby variations of light intensity falling on said resistance, and thereby varying the frequency of pulsations of said current are recognized as variations in pitch of a musical tone.

7. In a signaling apparatus, means for transmitting light rays, 3 spaced electrodes, means for heating one of the electrodes, a bulb enclosing said electrodes and containing a gas at a pressure between $\frac{1}{10}$ of a millimeter of mercury and 5 millimeters of mercury and circuits connecting said electrodes, one of the same including a source of potential and a light-reactive resistance, and means for translating variations in said light-reactive resistance into audible signals.

In witness whereof I have hereunto set my hand this 8 day of November, 1920.

THEODORE W. CASE.

Witnesses:
E. A. THOMPSON,
E. M. FRADENBURGH.